L. D. ROBINSON.
MOTOR CYCLE.
APPLICATION FILED OCT. 21, 1909.
948,250.
Patented Feb. 1, 1910.
2 SHEETS—SHEET 2.
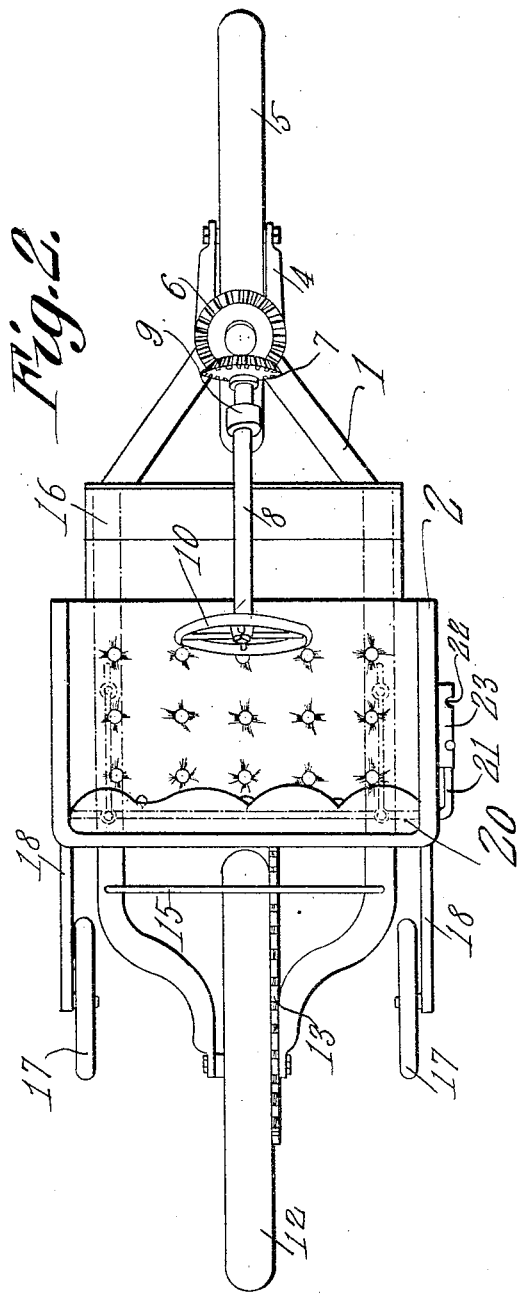
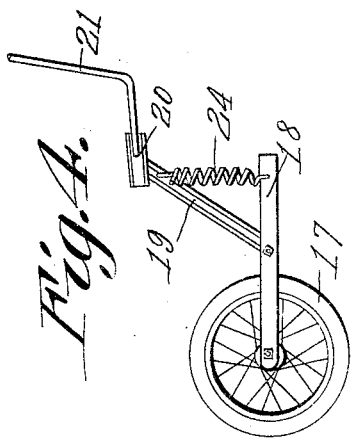
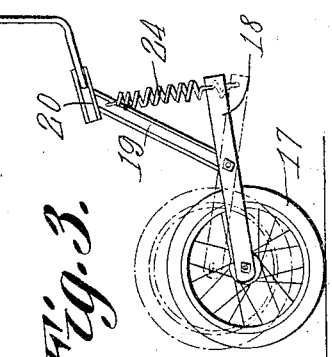
Witnesses
Inventor
Lawrence D. Robinson
By C. A. Snow & Co.
Attorneys

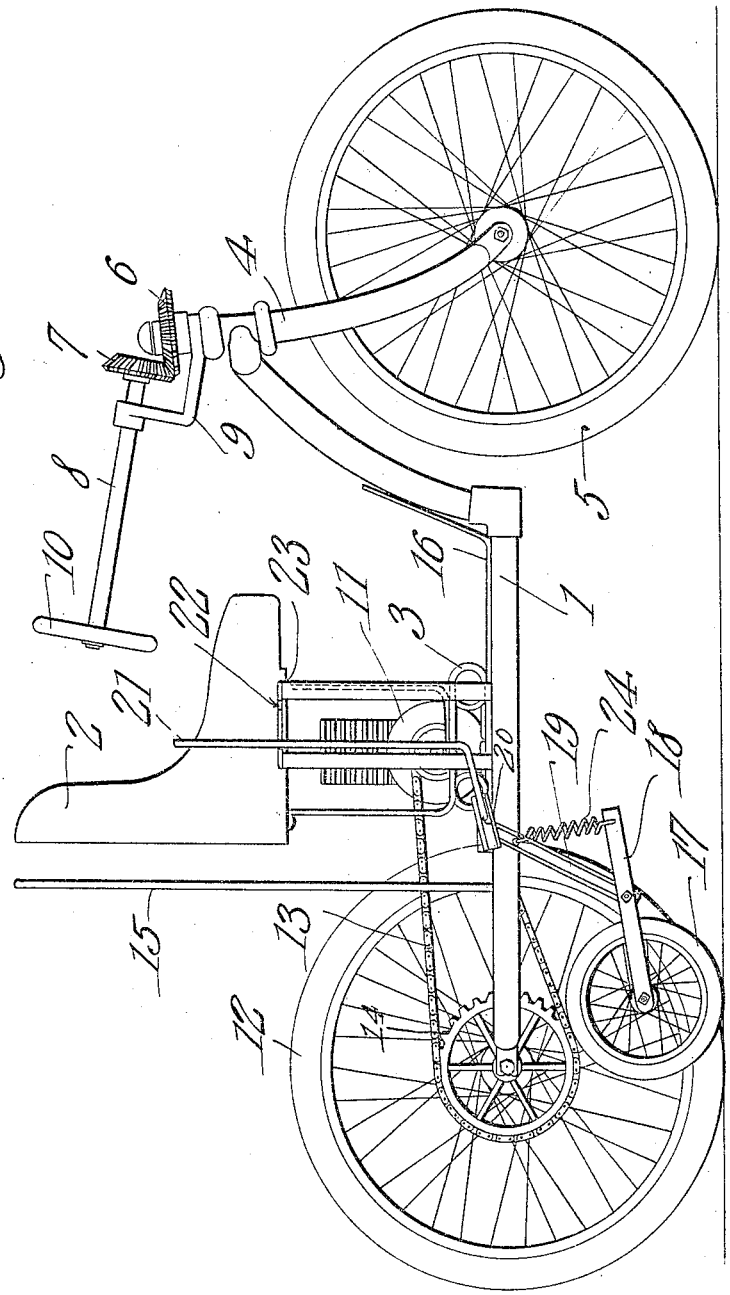

UNITED STATES PATENT OFFICE.

LAWRENCE D. ROBINSON, OF LENOX, GEORGIA.

MOTOR-CYCLE.

948,250.  Specification of Letters Patent.   Patented Feb. 1, 1910.

Application filed October 21, 1909. Serial No. 523,813.

*To all whom it may concern:*

Be it known that I, LAWRENCE D. ROBINSON, a citizen of the United States, residing at Lenox, in the county of Berrien and State of Georgia, have invented a new and useful Motor-Cycle, of which the following is a specification.

This invention relates to improvements in motor cycles and the particular object of the invention is to provide means whereby the machine will be prevented from tipping over when not in use.

The invention consists in certain novel features which are illustrated in the accompanying drawings and will be hereinafter first fully described and then particularly claimed.

In the drawings, Figure 1 is a side elevation of a motor cycle embodying my invention. Fig. 2 is a plan view of the same, and Fig. 3 is a detail view of the auxiliary wheel and its connections. Fig. 4 is a view showing a different position of the auxiliary wheel.

The frame 1 of the motor cycle may be of any desired form and is wide enough to support a seat 2 which will accommodate two passengers, the said seat being upholstered, as indicated most clearly in Fig. 2. The seat is supported upon springs 3 which are secured to the platform of the main frame 1 and are constructed with coils near their lower ends whereby the springs will possess a high degree of resiliency and the comfort of the passengers will be promoted. In the front end of the frame of the machine I mount a fork 4 in the lower end of which is journaled a traction wheel 5 which may be turned to one side or the other by rotating the fork so as to steer the machine, as will be readily understood. In order to easily accomplish the turning of the steering wheel and to prevent uncertainty in the rotation of the steering fork, I employ the mechanism illustrated which comprises a beveled gear wheel 6 on the upper end of the fork meshing with a similar beveled gear wheel 7 on the front end of a steering shaft 8 which is journaled in a bracket 9 secured to and projecting rearward from the front end of the main frame, the steering shaft being provided with a hand wheel 10 at its rear end which may be conveniently grasped by the driver upon the seat 2. It will be readily seen that by holding the hand wheel 10 quiet, the steering fork and the wheel carried thereby will be held in the central longitudinal line of the machine or at a fixed angle thereto so that the steering of the machine will not be subject to oscillations or lateral deflections which would change the course of the machine. When the hand wheel is turned in either direction, the beveled gears 6 and 7 will instantly respond to said movement and turn the steering wheel in the desired direction.

The motor 11 is secured upon the platform under the seat and between the supporting springs 3 and is connected with the driving wheel 12 at the rear end of the frame by a sprocket chain 13 and a sprocket wheel 14 secured upon the hub of the driving wheel. The motor may be of any desired type and is therefore illustrated in the drawings in a diagrammatic manner. By arranging the motor under the seat an economy of space is effected and the motor is protected from the dust from the roads or other influences which would tend to clog its operation. In order to still further protect the engine and also to protect the passengers and the seat from any mud or dust which may be thrown off by the driving wheel, a mud guard 15 is erected on the main frame immediately back of the seat, as shown, and as will be readily understood. A foot rest and dash board 16 is secured upon the main frame immediately in advance of the seat and this foot rest and dash board will not only furnish a convenient support for the feet of the passengers, but will also serve as a shield to receive and deflect any mud thrown off by the steering wheel.

When the motor cycles now in common use are driven at a slow speed or are stopped considerable difficulty is experienced in maintaining the machine in the upright position necessary for the proper care of the driving mechanism. In order to overcome this objection, I provide auxiliary wheels 17 which are arranged at the opposite sides of the machine and are carried by the lower ends of lever arms 18 which are pivoted between their ends to carrying arms or cranks 19 depending from the ends of a rock shaft 20 journaled transversely upon the main frame and provided at the right hand side of the machine with an upstanding operating lever or handle 21 extending up adjacent the side of the seat and adapted to engage notches 22 in a rack 23 arranged at the side of the seat, as shown, and as will be readily understood. Coil springs 24 are arranged between the front ends of the levers 18 and the carrying arms or cranks 19 and serve to normally hold the front ends of the levers upward so that the auxiliary wheels at the rear ends of the levers will roll upon the ground. It will be readily understood that when the auxiliary wheels 17 are lowered so as to be in contact with the surface of the ground, tipping of the machine will be prevented inasmuch as a support for the same will be provided on each side. When the machine is driven at a very slow speed or is stopping, the auxiliary wheels may be lowered so that they will roll upon the ground and should they strike a rock or other obstruction, the levers 18 will swing upon their pivotal connection with the carrying arms 19 against the tension of the springs 24, so that the wheels will ride over the obstruction without jolting the machine. When the obstruction has been passed, the springs will at once return the wheels to their former position. When the machine has acquired the desired speed, the operating lever or handle 21 is thrown forward and engaged in the forward notch of the rack 23 so that the rock shaft 20 will be rotated and the carrying arms 19 swung upward and rearward to hold the auxiliary wheel 17 off the ground, as will be readily understood. The auxiliary wheels, consequently, will offer no obstacle to the propulsion of the machine at a high speed in the usual manner, while at the same time they furnish a very simple and effective means for preventing the tipping of the machine when it is not in use or is about to stop.

Having thus described my invention, what I claim is:

The combination with a cycle frame, of a rock shaft mounted transversely thereon, crank arms depending from the ends of said shaft, levers pivoted to the lower ends of the said crank arms, springs connecting the front ends of the said levers with the crank arms, wheels carried by the rear ends of the said levers, and an operating lever extending upward from one end of the rock shaft.

In testimony that I claim the foregoing as my own, I have hereto affixed my signature in the presence of two witnesses.

LAWRENCE D. ROBINSON.

Witnesses:
JAMES R. KINARD,
JOHN R. ROBINSON.